United States Patent
Marczynski et al.

(10) Patent No.: US 7,415,888 B2
(45) Date of Patent: Aug. 26, 2008

(54) SAFETY DEVICE PARTICULARLY FOR MULTIPLE WHEEL NUTS

(76) Inventors: Michael Marczynski, Biggins House, High Biggins, Kirkby Lonsdale, Cumbria, LA6 2NP (GB); John Marriot, Kerhilley, Biddisham Lane, Biddisham, Axbridge, Somerset, BS26 2RH (GB)

(*) Notice: Subject to any disclaimer, the term of this patent is extended or adjusted under 35 U.S.C. 154(b) by 125 days.

(21) Appl. No.: 10/582,326

(22) PCT Filed: Dec. 14, 2004

(86) PCT No.: PCT/GB2004/005250

§ 371 (c)(1),
(2), (4) Date: Jun. 9, 2006

(87) PCT Pub. No.: WO2005/059381

PCT Pub. Date: Jun. 30, 2005

(65) Prior Publication Data

US 2007/0151355 A1    Jul. 5, 2007

(30) Foreign Application Priority Data

Dec. 17, 2003 (GB) .................................. 0329196.0

(51) Int. Cl.
*F16B 31/02* (2006.01)
(52) U.S. Cl. ........................................................ 73/761
(58) Field of Classification Search ................ 73/761
See application file for complete search history.

(56) References Cited

U.S. PATENT DOCUMENTS

| | | | | |
|---|---|---|---|---|
| 4,091,664 A | * | 5/1978 | Zerver | 73/862.21 |
| 4,648,684 A | * | 3/1987 | Mattis et al. | 439/585 |
| 5,223,822 A | * | 6/1993 | Stommes et al. | 137/551 |
| 5,277,223 A | * | 1/1994 | Glockner et al. | 137/554 |
| 6,158,933 A | | 12/2000 | Nicholson et al. | |
| 6,595,597 B2 | * | 7/2003 | Marczynski et al. | 301/37.374 |
| 2003/0071205 A1 | * | 4/2003 | Wu et al. | 250/239 |

FOREIGN PATENT DOCUMENTS

| | | |
|---|---|---|
| GB | 2 242 720 | 3/1990 |
| GB | 2 335 720 | 9/1999 |
| GB | 2 393 487 | 3/2004 |

* cited by examiner

*Primary Examiner*—Max Noori
(74) *Attorney, Agent, or Firm*—Dennison, Schultz & MacDonald

(57) ABSTRACT

A safety device (10) comprises a plurality of wheel nut position indicators (30) captively but rotatably mounted in a holder (12). The position indicators are attachable to respective wheel nuts (40) by means of fastener covers (50). When attached, the fastener covers (50) act to secure the device to a wheel and to transfer any rotational movement, i.e. loosening, of a wheel nut (40) to an associated position indicator (30). The indicators (30) each have an indicator portion, e.g. a triangular pointer (34) and are so arranged that this portion emerges from the holder and hence becomes visible when any such rotation occurs. By removing a fastener cover (50) an indicator (30) is disengaged from a wheel nut (40) and the individual wheel nut can be tightened without having to remove the entire device (10).

10 Claims, 4 Drawing Sheets

SAFETY DEVICE PARTICULARLY FOR MULTIPLE WHEEL NUTS

This application is a 371 of PCT/GB2004/005250 filed on Dec. 14, 2004.

This invention concerns a safety device for rotatable fasteners, in particular a device for use with a plurality of wheel nuts securing a wheel to a hub.

The loosening of wheel nuts on vehicles, such as lorries, is a known safety problem. Safety devices are available in the form of indicators attachable to individual wheel nuts. When a nut loosens an associated indicator, in the form of a ring mounted pointer, rotates and a visual indication is given of loosening. An example of such a device is disclosed in GB2335720 (Business Lines Ltd).

In practice two criteria are used to establish the safety of a wheel nut. Firstly, a given torque is applied to a nut when tightening and, secondly, when secured, a number of threads of a stud on to which a wheel nut is attached should be visible above a secured nut.

Current indicators have the disadvantage that it is necessary to apply each indicator individually, which is time consuming on commercial vehicles where five, six, eight or ten or more wheels nuts may be present on each wheel.

It is an aim of the present invention to overcome or limit the above disadvantage.

According to the present invention there is provided a safety device for indicating relative rotational displacement of any one of a plurality of rotatably securable fasteners, the device comprising a holder in which a plurality of position indicators for indicating rotational position of the respective fasteners are captively but rotatably mounted and at least one fastener cover which is removably locatable over a fastener and attachable to a corresponding position indicator so as link movement of the fastener and the said position indicator.

Such a device is particularly suitable for use with wheel nuts where respective indicators serve to indicate if/when respective wheel nuts have become loose.

A safety device of the invention provides a means for simultaneously applying or removing all position indicators, thus saving time. More importantly, a safety device of the invention provides a means whereby individual fasteners may be adjusted without removing the whole safety device.

The holder ensures that position indicators may not be individually removed and potentially not replaced. The position indicators may be captively but rotatably mounted in the holder by being a snap fit in to apertures in the holder. Position indicators may be thereby easily replaced if damaged, such as by wear of a wheel nut engaging portion. The holder may be an annular disc or ring.

The fastener covers ensure that to adjust a fastener the relevant indicator means is disconnected from the fastener but that other indicator means on the holder are not and therefore do not need repositioning. Furthermore by providing fastener covers which are separately removable, the corresponding wheel nut is accessible through the centre of the position indicator and an additional benefit is that thread visibility can be readily checked without removing the whole device from a wheel.

Additionally on removal of a fastener cover the linked position indicator is disengaged from the nut so that an operator is not tempted simply to turn the nut back to its original position rather than to a correct torque.

Position indicators in safety devices of the invention preferably include an indicator portion that is hidden from view by the holder when in a first, 'safe' position, which in use corresponds to an initial fastener position, and is visible outside the holder when in a second position, which in use corresponds to a loosened fastener position.

An indicator portion of a position indicator, whether or not it is alternatively hidden or visible as just mentioned, may be made highly visible, e.g. by bright colouring, and holders given a neutral appearance so as to give an at-a-glance indication of a loose fastener.

The invention provides a means of seeing a visually striking indication of an unsafe wheel nut condition only when that condition occurs. When the wheel nut is in a safe condition the indicator portion is hidden from sight. Conventional wheel nut indicators do not exhibit this change as such indicators are always visible.

By linking the fastener cover and the indicator device a mechanism is also made available for signalling when a fastener cover has not been replaced. Position indicators used in devices of the invention may be asymmetrical about the longitudinal axis of a wheel nut on a wheel to which they may be attached such that, in use, any position indicator not attached to a fastener cover is flung by centripetal forces on rotation of the wheel into an indicating position. Should a fastener cover not be replaced after tightening a wheel nut then the position indicator will default to the 'loose' or indicating position when a wheel starts to rotate.

The fastener covers may be attachable to the position indicators by means of splines on one or both of the cover and the indicator. Preferably the splines are on the inside of a collar portion of each position indicator to correspond with splines on the outside of each fastener cover. The fastener covers may be attachable to fasteners by means of splines on the inside of the fastener covers.

Safety devices of the invention may comprise a plastics material, in particular polyethylene or polypropylene. Such materials are readily deformable to form a push fit connection between parts.

The invention will be described further, by way of example, with reference to the accompanying drawings, in which.

A practical embodiment of a safety device (10) according to the invention is made of high density polyethylene and comprises, a holder (12), a plurality of position indicators (30) and an equal number of fastener covers in the form of caps (50).

Figure 4:
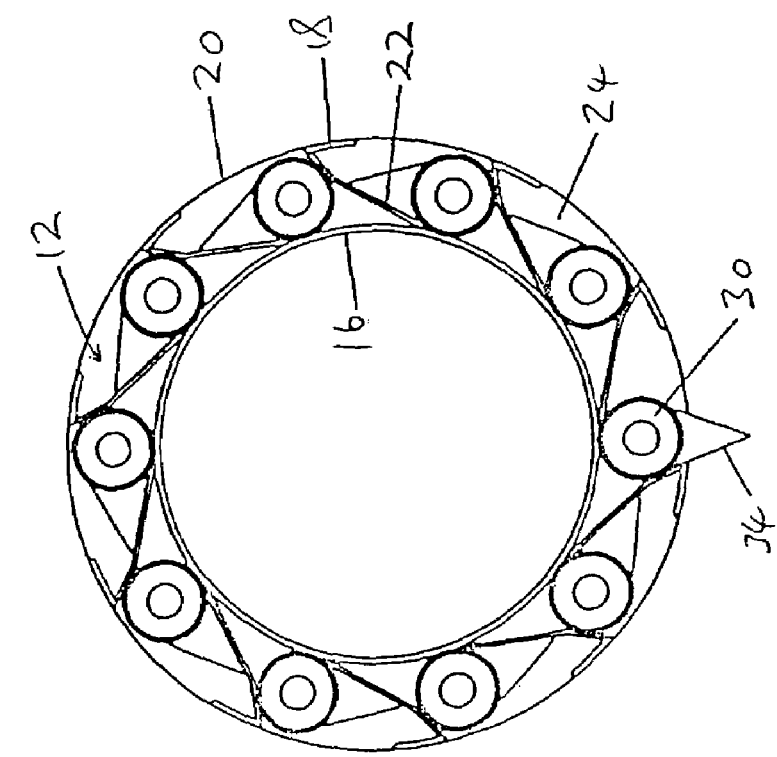
FIG. 4 is a plan view from below of the device shown in FIG. 1.
Figure 6:
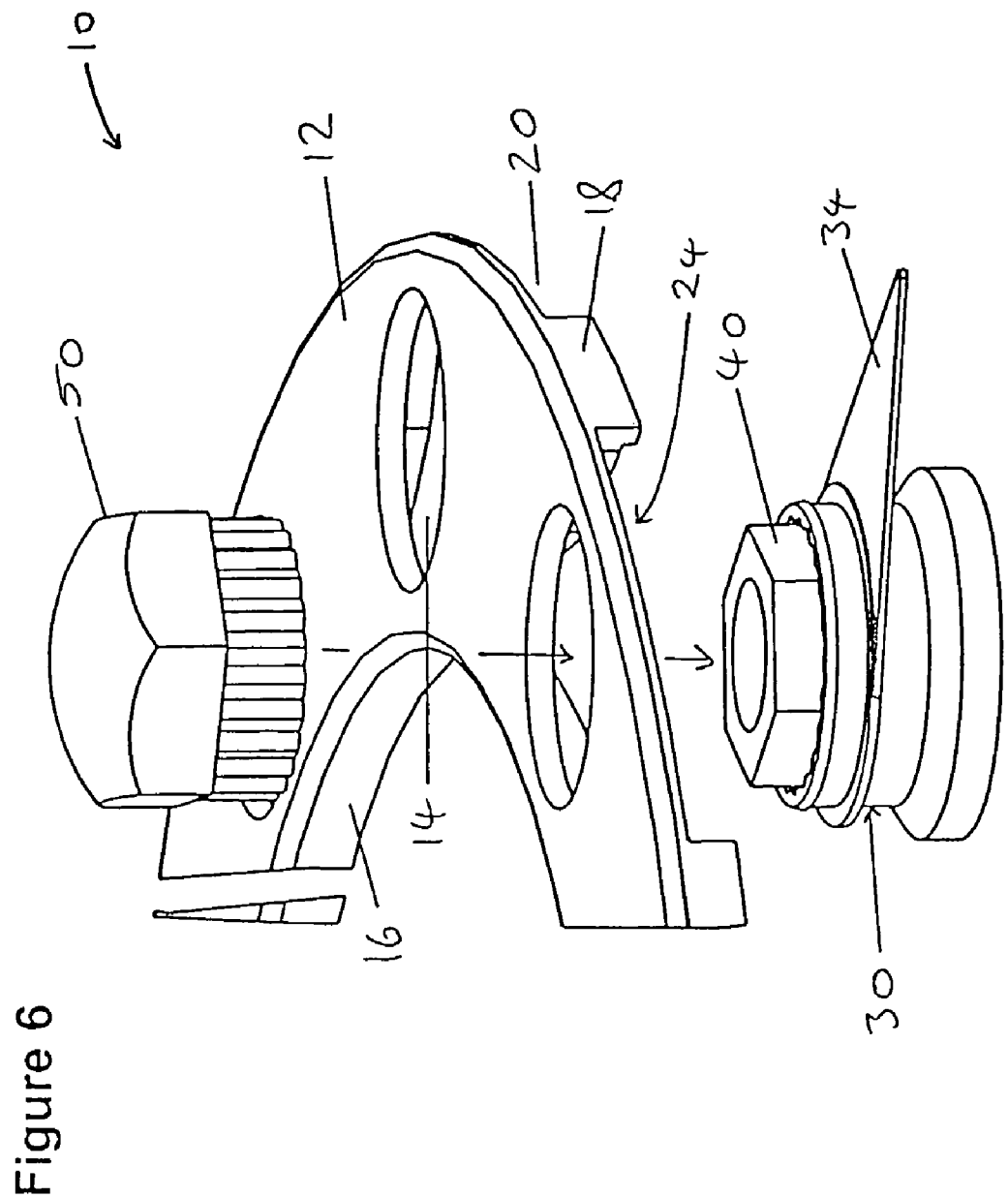
FIG. 6 is a partial perspective view illustrating the manner of association of a device as shown in FIG. 1 with a wheel nut.

The holder (12) is in the form of a substantially planar ring, which is provided with a series of identical apertures (14) equally spaced around the ring. The holder has an inner rim with a continuous flange (16), and an outer rim also with a flange (18) but one which is discontinuous so as to leave a gap (20) in the region of each aperture (14). The inner (16) and outer (18) rims are joined across the lower face of the holder, which is adjacent a wheel when in use, by a diagonal wall (22) as shown in FIG. 4, which serves to give rigidity to the holder (12) and to provide a recess (24).

Each position indicator (30) comprises a body portion or collar (32) and a projecting indicator portion (34) in the form of a triangular pointer. The body or collar (32) has an external annular bearing surface (33) defined between an upper rim (35) and a lower rim (37), a bore (36) provided with splines (38) and a lower region in the form of an outwardly extending flange (44). The lower rim (37) is coplanar with and extends to form the triangular pointer (34), which is highly coloured, e.g. fluorescent yellow.

Figure 1:
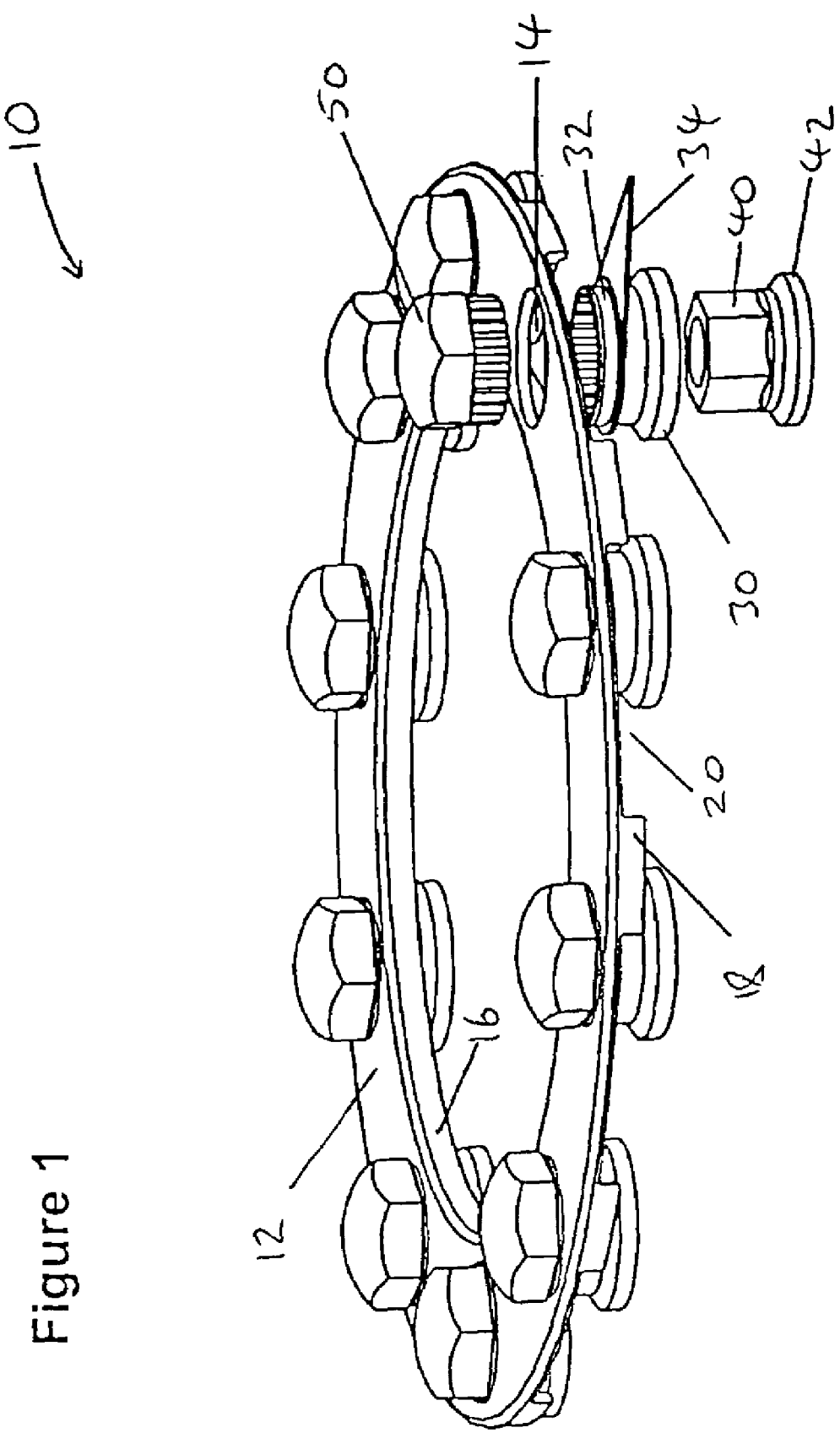
FIG. 1 is a perspective view of a device according to the invention, in which one part of the device is shown in exploded view.
Figure 2:
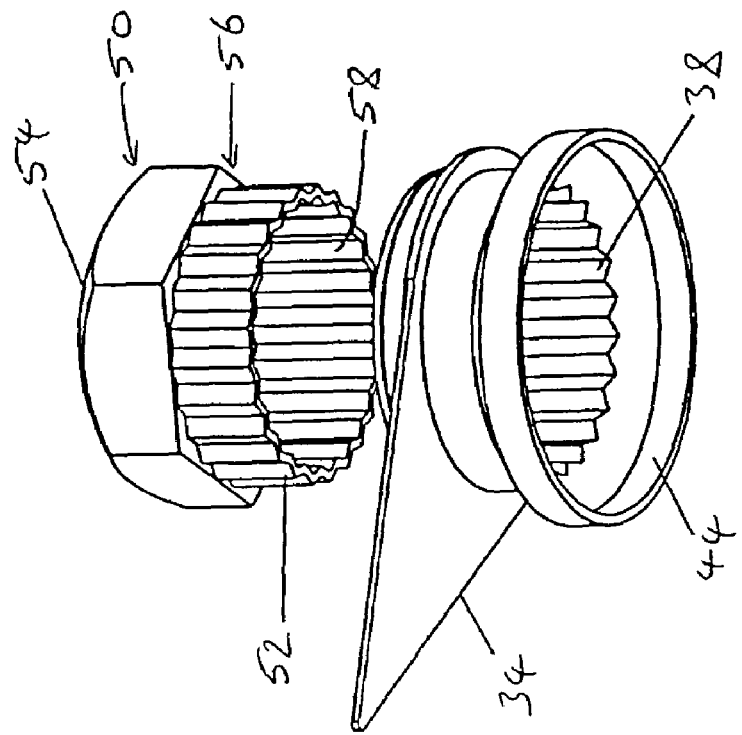
FIG. 2 is a perspective view from above of a single position indicator and a fastener cover as illustrated in FIG. 1.
Figure 3:
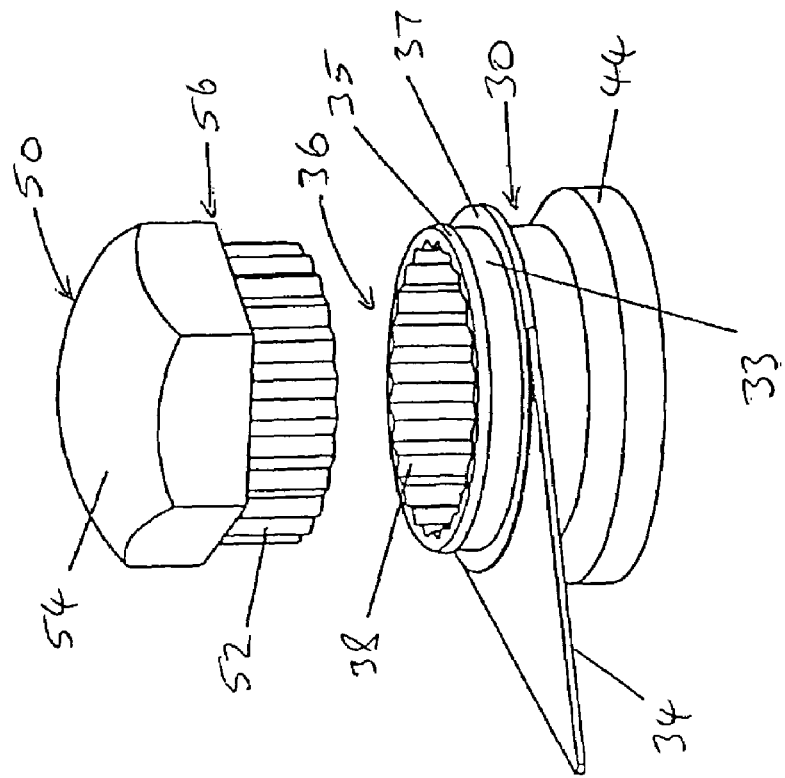
FIG. 3 is a perspective view of the same parts as FIG. 2 but from below.

The body or collar (32) of each position indicator (30) is clipped as a snap fit into a respective aperture (14) in the holder (12), as is apparent in FIG. 1 with the bearing surface (33) held in the aperture by the upper and lower rims (35, 37). With the collar (32) so positioned, the triangular pointer (34) can be accommodated in the respective recess (24) in the holder (12), as shown in FIG. 4. The purpose of the flange (44) is to shroud any washer (42) that may be present on a wheel nut (40) over which it is to be fitted.

The cap (50) comprises a cylindrical wall (56) and a top (54) closing off one end. The wall (56) has a lower portion formed externally with splines (52) for linking with the internal splines (38) of the position indicator (30) in any one of a large number of rotational positions. The wall (56) also has splines (58) on the inside for retention of the cap (50) on a wheel nut (40) by a push fit. The provision of splines (58) enables the cap to be fitted to a hexagonal nut in a plurality of rotational positions such that the pointer (34) can be readily positioned in the recess (24) of the holder. The upper half of the wall (56) and the top (54) of the cap (50) are configured to simulate a nut.

Figure 5:
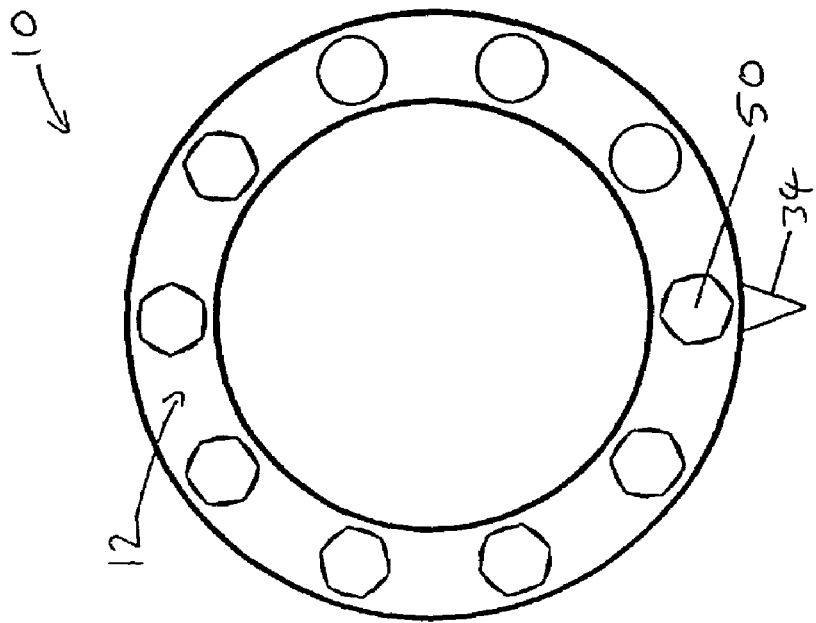
FIG. 5 is a top view corresponding to FIG. 4.

When viewed from below (FIG. 4) each pointer (34) is stowed in a respective recess (24) formed by the bottom face of the holder, the inner rim (16), the outer rim (18) and the intervening wall (22) when its respective position indicator (30) is in a normal safe position. However, when an indicator (30) is in a 'loose' position (lower indicator in FIGS. 4 and 5) its pointer (34) extends out from the recess (24) and clear of the holder (12) such that the pointer (34) will be visible in use if a wheel nut loosens.

In use, a device of the invention (10) comprising the holder (12) with a position indicator (30) in every aperture (14) is intended to be placed on a wheel (not shown) held in place by correctly torqued wheel nuts (40). Each position indicator (30) is oriented with its pointer (34) hidden in a recess (24) in the holder (12) and a cap (50) is placed over each nut (40) to engage with a position indicator (30) such that the caps retain the holder (12) in place on the wheel.

After installation, routine inspection of the device is carried out and if a wheel nut (40) has loosened and thus made the relevant pointer (34) visible remedial tightening takes place. This is achieved by removing the relevant cap (50), thus releasing the corresponding position indicator (30). The wheel nut (40) is then tightened to a desired torque, the position indicator (30) re-adjusted to hide its pointer (34) in the recess (22) and the cap (50) is replaced.

The skilled person will realise that workshop variants may be practised without departing from the scope of the invention. For example, the position indicator may be rotatably retainable by frictional engagement on the washer of a wheel nut so that the holder can be retained on a wheel when none of the caps (50) are in place, e.g. when the holder (12) is first being fitted onto the wheel. It will also be appreciated that the invention could be applicable in other situations where a multiplicity of rotatable fasteners are in use and means of indicating their respective rotational positions, indicative of tightness/loosening of same, is required as well as means of remedying same without removal of the entire device.

The invention claimed is:

1. A safety device for indicating relative rotational displacement of any one of a plurality of rotatably securable fasteners, the device comprising
   a holder having a plurality of apertures, a plurality of position indicators for indicating rotational position of the respective fasteners, said indicators being captively and rotatably mounted in the apertures of said holder; and
   at least one fastener cover which is removably located over a fastener and attachable inside a corresponding position indicator so as to link movement of the fastener and the position indicator.

2. A safety device according to claim 1 wherein each position indicator includes an indicator portion having a first position and a second position, wherein in the first position, which corresponds to an initial fastener position, the indicator portion is hidden from view by the holder, and wherein in the second position, which corresponds to a loosened fastener position, the indicator portion is visible outside the holder.

3. A safety device according to claim 1 wherein each position indicator includes an indicator portion made highly visible to provide an at-a-glance indication of a loose nut.

4. A safety device according to claim 1 wherein the position indicators are engaged in the apertures in the holder by means of a snap fit.

5. A safety device according to claim 1 wherein the holder is an annular disc.

6. A safety device according to claim 1 wherein each position indicator is asymmetrical and is thereby capable of moving position in use when not linked to a fastener cover by means of centripetal force about a fastener when in circular motion on a wheel.

7. A safety device according to claim 1 wherein each position indicator is attached to a corresponding fastener cover by means of splines on one or both of the indicator and the cover.

8. A safety device according to claim 1 wherein each fastener cover is attached to a fastener by means of splines on the fastener cover.

9. A kit of parts for a safety device according to claim 1 wherein said kit comprises a holder, a plurality of position indicators and a plurality of fastener covers.

10. A wheel equipped with a safety device according to claim 1.

* * * * *